(12) United States Patent
 Tsubaki

(10) Patent No.: US 9,981,682 B2
(45) Date of Patent: May 29, 2018

(54) ELECTRIC POWER STEERING APPARATUS

(71) Applicant: NSK LTD., Tokyo (JP)

(72) Inventor: Takahiro Tsubaki, Maebashi (JP)

(73) Assignee: NSK LTD., Tokyo (JP)

( * ) Notice: Subject to any disclaimer, the term of this patent is extended or adjusted under 35 U.S.C. 154(b) by 0 days. days.

(21) Appl. No.: 15/548,170

(22) PCT Filed: Feb. 4, 2016

(86) PCT No.: PCT/JP2016/053343
§ 371 (c)(1),
(2) Date: Aug. 2, 2017

(87) PCT Pub. No.: WO2016/125854
PCT Pub. Date: Aug. 11, 2016

(65) Prior Publication Data
US 2018/0029633 A1 Feb. 1, 2018

(30) Foreign Application Priority Data
Feb. 4, 2015 (JP) ................................. 2015-019922

(51) Int. Cl.
*B62D 5/04* (2006.01)
*B62D 6/00* (2006.01)
(52) U.S. Cl.
CPC ......... *B62D 5/0463* (2013.01); *B62D 5/0409* (2013.01); *B62D 6/00* (2013.01)
(58) Field of Classification Search
CPC ....... B62D 5/0463; B62D 5/046; B62D 1/286
See application file for complete search history.

(56) References Cited

U.S. PATENT DOCUMENTS

2001/0054519 A1* 12/2001 Nishiwaki ............. B62D 1/286
 180/167
2008/0051959 A1* 2/2008 Ishihara ................ B62D 5/046
 701/41

FOREIGN PATENT DOCUMENTS

JP 10-258756 A 9/1998
JP 11-286280 A 10/1999
(Continued)

OTHER PUBLICATIONS

International Search Report of PCT/JP2016/053343, dated May 10, 2016. [PCT/ISA/210].
(Continued)

*Primary Examiner* — Yuri Kan
(74) *Attorney, Agent, or Firm* — Sughrue Mion, PLLC

(57) ABSTRACT

[Problem]
An object of the present invention is to provide an electric power steering apparatus that performs a judgment of a manual input during an automatic steering control by an accurate and precise method based on the mechanical equation, and have a steering performance which a driver and a fellow passenger do not feel uncomfortable.
[Means for solving the problem]
The present invention is an electric power steering apparatus that assist-controls a steering system by driving a motor based on a motor current command value and has a function performing an automatic steering control and a manual steering control, comprising: a function that calculates a time series response of a torsion bar torque based on a mechanical equation due to characteristics of a handle and a torsion bar, judges an adaptation degree of the calculated steering torque calculated-value and a detected value of the (Continued)

torsion bar torque, and judges "presence" or "absence" of a manual input during the automatic steering control by means of the adaptation degree.

3 Claims, 5 Drawing Sheets

(56) References Cited

FOREIGN PATENT DOCUMENTS

| | | |
|---|---|---|
| JP | 11-321686 A | 11/1999 |
| JP | 2006-248419 A | 9/2006 |
| JP | 3845188 B2 | 11/2006 |
| JP | 2012-096568 A | 5/2012 |
| JP | 2013-237316 A | 11/2013 |
| WO | 2014/119359 A1 | 8/2014 |
| WO | 2014/122997 A1 | 8/2014 |

OTHER PUBLICATIONS

International Preliminary Report on Patentability of PCT/JP2016/053343, dated May 10, 2016. [PCT/IPEA/409].

* cited by examiner

PRIOR ART

PRIOR ART

ELECTRIC POWER STEERING APPARATUS

CROSS REFERENCE TO RELATED APPLICATIONS

This application is a National Stage of International Application No. PCT/JP2016/053343 filed Feb. 4, 2016, claiming priority based on Japanese Patent Application No. 2015-019922, filed Feb. 4, 2015, the contents of all of which are incorporated herein by reference in their entirety.

TECHNICAL FIELD

The present invention relates to an electric power steering apparatus having an automatic steering control function (a parking assist mode, a lane keeping mode or the like) and a manual steering control function, and in particular to the electric power steering apparatus that precisely judges "presence" or "absence" of a manual input of a driver during the automatic steering control based on a mechanical or physical equation due to characteristics of a handle and a torsion bar, and safely shift to a normal assist control (a manual steering control) in a case that a manual input is occurred.

BACKGROUND ART

An electric power steering apparatus which provides a steering system of a vehicle with a steering assist torque (an assist torque) by means of a rotational torque of a motor, applies the steering assist torque to a steering shaft or a rack shaft by means of a transmission mechanism such as gears or a belt through a reduction mechanism. In order to accurately generate the assist torque, such a conventional electric power steering apparatus performs a feedback control of a motor current. The feedback control adjusts a voltage supplied to the motor so that a difference between a steering assist command value (a current command value) and a detected motor current value becomes small, and the adjustment of the voltage applied to the motor is generally performed by an adjustment of a duty of a pulse width modulation (PWM) control.

A general configuration of the conventional electric power steering apparatus will be described with reference to FIG. 1. As shown in FIG. 1, a column shaft (a steering shaft or a handle shaft) 2 connected to a handle (steering wheel) 1 is connected to steered wheels 8L and 8R through reduction gears 3, universal joints 4a and 4b, a rack-and-pinion mechanism 5, and tie rods 6a and 6b, further via hub units 7a and 7b. In addition, the torsion bar is interposed within the column shaft 2, the column shaft 2 is provided with a steering angle sensor 14 for detecting a steering angle θ of the handle 1 by means of a torsional angle of the torsion bar and a torque sensor 10 for detecting a steering torque Th of the handle 1, and a motor 20 for assisting a steering force of the handle 1 is connected to the column shaft 2 through the reduction gears 3. The electric power is supplied to a control unit (ECU) 30 for controlling the electric power steering apparatus from a battery 13, and an ignition key signal is inputted into the control unit 30 through an ignition key 11. The control unit 30 calculates a steering assist command value of an assist (a steering assist) command on the basis of a steering torque Th detected by the torque sensor 10 and a vehicle speed Vel detected by a vehicle speed sensor 12, and controls a current supplied to the motor 20 by means of a voltage control command value Vref obtained by performing compensation or the like to the steering assist command value. It is possible to receive the vehicle speed Vel from a controller area network (CAN) or the like.

A steering angle sensor 14 is not indispensable and may not be provided. It is possible to obtain the steering angle from a rotational position sensor which is connected to the motor 20.

The controller area network (CAN) 40 to send/receive various information and signals on the vehicle is connected to the control unit 30, and it is also possible to receive the vehicle speed Vel from the CAN. Further, a Non-CAN 41 is also possible to connect to the control unit 30, and the Non-CAN 41 sends and receives a communication, analogue/digital signals, electric wave or the like except for the CAN 40.

The control unit 30 mainly comprises a CPU (Central Processing Unit) (including an MPU (Micro Processor Unit) and an MCU (Micro Controller Unit)), and general functions performed by programs within the CPU are, for example, shown in FIG. 2.

The control unit 30 will be described with reference to FIG. 2. The steering torque Th detected by the torque sensor 10 and the vehicle speed Vel detected by the vehicle speed sensor 12 (or from the CAN 40) are inputted into a torque control section 31 to calculate a current command value Iref1. The torque control section 31 calculates the current command value Iref1, which is a control target value of a current supplied to the motor 20, based on the steering torque Th and the vehicle speed Vel using an assist map or the like. The current command value Iref1 is inputted into a current limiting section 33 via an adding section 32A, the current command value Irefm that is limited the maximum current, is feed-backing-inputted into a subtracting section 32B. A deviation I (=Irefm−Im) between the current command value Irefm and a motor current value Im is calculated and the deviation I is inputted into a current control section 35, which performs a proportional-integral (PI)-control and so on, for improving a characteristic of the steering operation. The voltage control command value Vref that the characteristic is improved at the current control section 35, is inputted into a PWM-control section 36, and the motor 20 is PWM-driven through an inverter 37. The current value Im of the motor 20 is detected by a motor current detector 38 and is fed-back to the subtracting section 32B. The inverter 37 is constituted by a bridge circuit of field-effect transistors (FETs) serving as semiconductor switching devices.

A rotational sensor 21 such as a resolver is connected to the motor 20 and a motor rotational angle θ is outputted.

A compensation signal CM from a compensation signal generating section 34 is added at the adding section 32A. A characteristic compensation of the steering system is performed by adding the compensation signal CM, and then a convergence, an inertia property and so on are improved. The compensating section 34 adds a self-aligning torque (SAT) 343 with an inertia 342 at an adding section 344, further adds the result of addition performed at the adding section 344 with a convergence 341 at an adding section 345, and then outputs the result of addition performed at the adding section 345 as the compensation signal CM.

In such an electric power steering apparatus, recently, the vehicles, which have the automatic steering control function such as the parking assist function (parking assist), the lane keeping function and so on, and switch between the automatic steering control and the manual steering control, have been appeared. In the vehicles having the parking assist function, the target steering angle is set based on data from a camera (an image), a distance sensor and so on, and the automatic steering control that an actual steering angle follows a target steering angle, is performed.

In the conventional electric power steering apparatus having a well-known automatic steering control function, a back-in parking or a parallel parking is automatically performed by controlling the motor based on a relationship between a pre-stored traveling distance of the vehicle and a turning steering angle.

FIG. 3 shows a configuration example of a control system of the vehicle having the conventional automatic steering control function, and the control system of the vehicle comprises a torque control section 110 to calculate the current command value Itref by inputting at least the steering torque, an automatic steering control section 120 to calculate the current command value Isref by inputting the target steering angle or the like from the ECU of the vehicle side, and a switching section 130 to output as the current command value Iref by switching the current command value Itref or Isref depending on a switching signal SW from the ECU of the vehicle side. The current command value Iref is inputted into a current control/driving section 140, and the current control/driving section 140 PWM-controls the motor 20 with a PWM-signal being performed the PI-control or the like.

In such a vehicle having the automatic steering control function, when the driver operates the handle during the automatic steering control function and it is judged that the steering torque is greater than a predetermined value being stored in advance, the automatic steering control is conventionally stopped.

However, if the judging is performed only by comparing the output of the steering torque detecting means with the predetermined value, the output of the automatic steering detecting means becomes temporarily higher than the predetermined value due to a noise of the steering torque detecting means, or an inertia torque of the handle when the tire steps on a small stone or the automatic steering is performed by means of the motor. Thus, there is a problem that the automatic steering control is stopped at each time. In order to avoid such a disadvantage, when the predetermined value is set higher, not only the driver feels uncomfortable since the automatic steering and the manual steering interfere with each other, but also the automatic steering control cannot be immediately stopped even if the driver operates the handle during the automatic steering control.

Then, when the steering torque being the predetermined value or more is detected over a predetermined time or more, it is thought that the control system judges the performance of the manual steering and then stops the automatic steering control. In this case, when the driver operates a moderate manual steering and the steering torque is slightly higher than the predetermined value, the driver does not feel uncomfortable and the automatic steering control is stopped after the predetermined time is passed. However, in a case that the driver operates the rapid manual steering and then the steering torque is considerably higher than the predetermined value, the handle is not steered smoothly and the driver may feel uncomfortable because the automatic steering is not stopped until the above state elapses the predetermined time.

As an apparatus for resolving the above problem, for example, Japanese Patent No. 3845188 B2 (Patent Document 1) is proposed. The apparatus disclosed in Patent Document 1 comprises a steering torque detecting means to detect a steering torque which a driver applies to a handle, and a motor control means to control the driving of the motor based on a traveling track which is set by a traveling track setting means and to stop the motor control due to the traveling track when the steering torque being a predetermined value or more is detected over a predetermined time or more. Then, the apparatus sets plural kinds on the predetermined value and changes the predetermined time corresponding to the respective predetermined values.

THE LIST OF PRIOR ART DOCUMENTS

Patent Documents

Patent Document 1: Japanese Patent No. 3845188 B2

SUMMARY OF THE INVENTION

Problems to be Solved by the Invention

However, in the apparatus of Patent Document 1, a threshold to the steering torque is provided, and the switching to the manual input is performed whether the steering torque is higher than the threshold or not. Consequently, since the switching is not based on an actual mechanical model of the steering system, there is a problem that the detection or the judgment of the manual input cannot be precisely performed and a delay occurs in a time from the manual input to the judgment.

The present invention has been developed in view of the above-described circumstances, and an object of the present invention is to provide the electric power steering apparatus that performs a judgment (a detection) of the manual input during the automatic steering control by an accurate and precise method based on the mechanical equation, and have a steering performance which the driver and a fellow passenger do not feel uncomfortable.

Means for Solving the Problems

The present invention relates to the electric power steering apparatus that assist-controls the steering system by driving the motor based on the motor current command value and has a function performing the automatic steering control and the manual steering control, the above-described object of the present invention is achieved by that comprising: a function that calculates a time series response of a torsion bar torque based on a mechanical equation due to characteristics of a handle and a torsion bar, judges an adaptation degree of the calculated steering torque calculated-value and a detected value of the torsion bar torque, and judges "presence" or "absence" of a manual input during the automatic steering control by means of the adaptation degree.

The above-described object of the present invention is efficiently achieved by that: wherein the time series response of the torsion bar torque is a handle angle, and the detected value of the torsion bar torque is a column angle; or wherein the handle angle is corresponding to the steering torque calculated-value, and the column angle is corresponding to a steering torque detected-value; or wherein the adaptation degree is performed by a relationship of passing of a measuring time within a calculating period, a setting period and a starting time point of the setting period, and by a relationship of an accumulating value of a difference between the steering torque calculated-value and the steering torque detected-value, and a threshold; or wherein it is judged that a manual input is "presence" when the passing of the measuring time is the setting period or more and the accumulating value is the threshold or more; or wherein the automatic steering control is stopped when it is judged that the manual input is "presence".

Effects of the Invention

According to the electric power steering apparatus of the present invention, the electric power steering apparatus calculates the time series response of the torsion bar torque based on the mechanical equation due to the characteristics of the handle and the torsion bar, judges the adaptation degree of the calculated result-value and the detected value of the torsion bar torque, and judges the manual input during the automatic steering control by means of the adaptation degree. Therefore, it is possible to perform an accurate and precise judging (detecting) of the manual input and achieve a steering performance that the driver and the fellow passenger do not feel uncomfortable.

Further, since the judgment of the manual input is performed based on the accumulating value of the time series response of the torsion bar torque, the defect such that the automatic steering control is immediately stopped in a case that the detected value is temporarily greater due to the noise, or due to the inertia torque of the handle when the tire steps on the small stone, is resolved.

MODE FOR CARRYING OUT THE INVENTION

In a vehicle that has an automatic steering control function such as a parking assist and a lane keeping, and a manual steering control function which is a normal assist control, when a manual input from a driver occurs during the automatic steering control maneuver, it is necessary to shift the steering operation to the normal assist control, safely and smoothly. Further, when the steering operation enters to the automatic steering control mode such as the parking assist and the lane keeping, it is necessary to confirm "presence" or "absence" of the manual input due to the driver.

Therefore, in the present invention, the electric power steering apparatus judges an adaptation degree of a steering torque calculated-value of a time series response in a torsion bar torque which is estimated from a mechanical or physical equation due to a handle inertia, a torsion bar characteristic and a motor angle (a column angle), which no manual input state is considered, and of a detected value of a time series response in an actual torsion bar torque, and then judges "presence" or "absence" of the manual input according to a judged result of the adaptation degree. The judgment of the adaptation degree is performed by measuring a time pass and accumulating (integrating) a difference between the calculated value and the detected value. "Presence" or "absence" of the manual input is judged whether the measuring time elapsed a predetermined time or more and the accumulating value of the difference is a predetermined threshold or more, or not. When the manual input "presence" is judged, the automatic steering control is stopped and the steering operation is shifted (switched) from the automatic steering control to the normal assist control.

Figure 1:
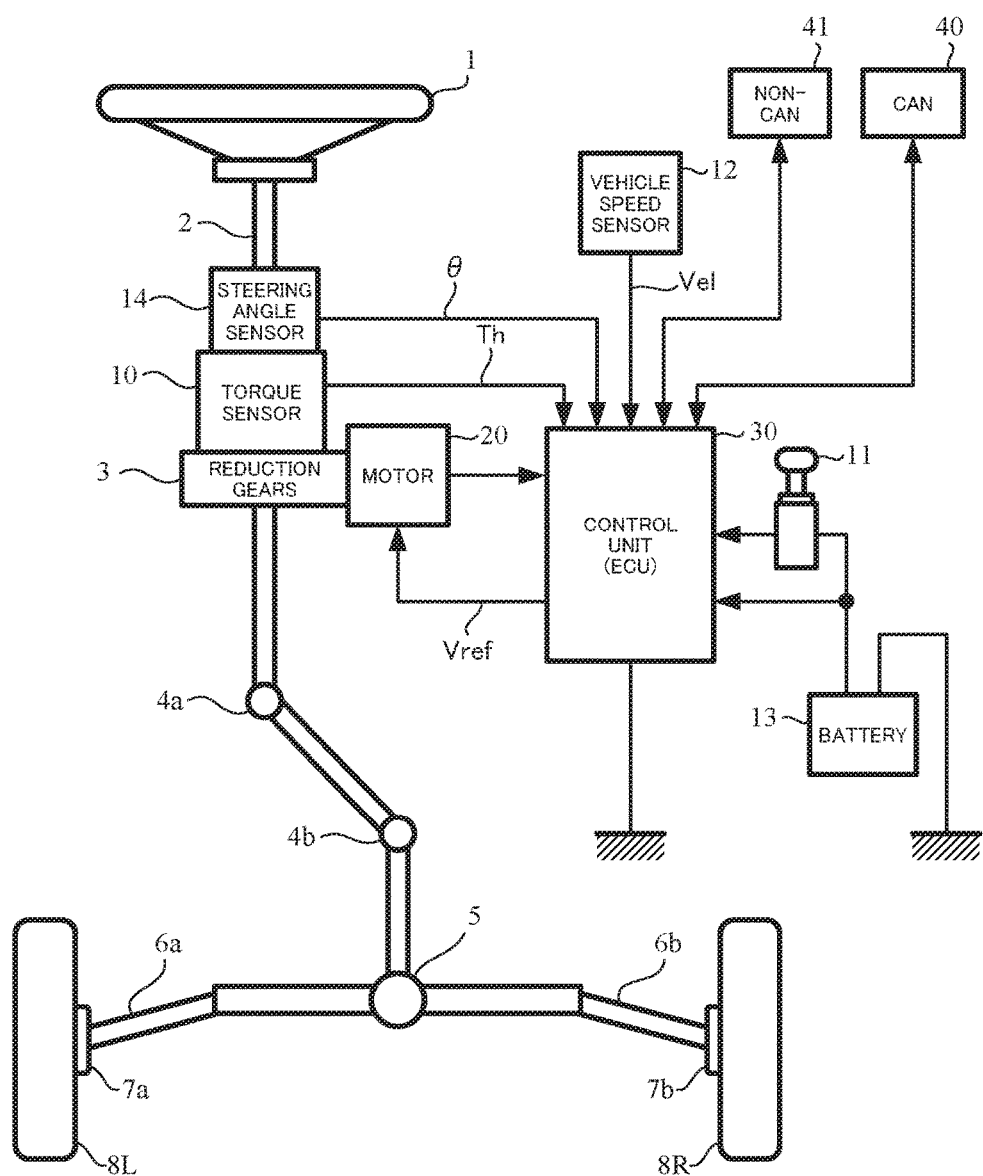
FIG. 1 is a configuration diagram illustrating a general outline of an electric power steering apparatus.
Figure 2:
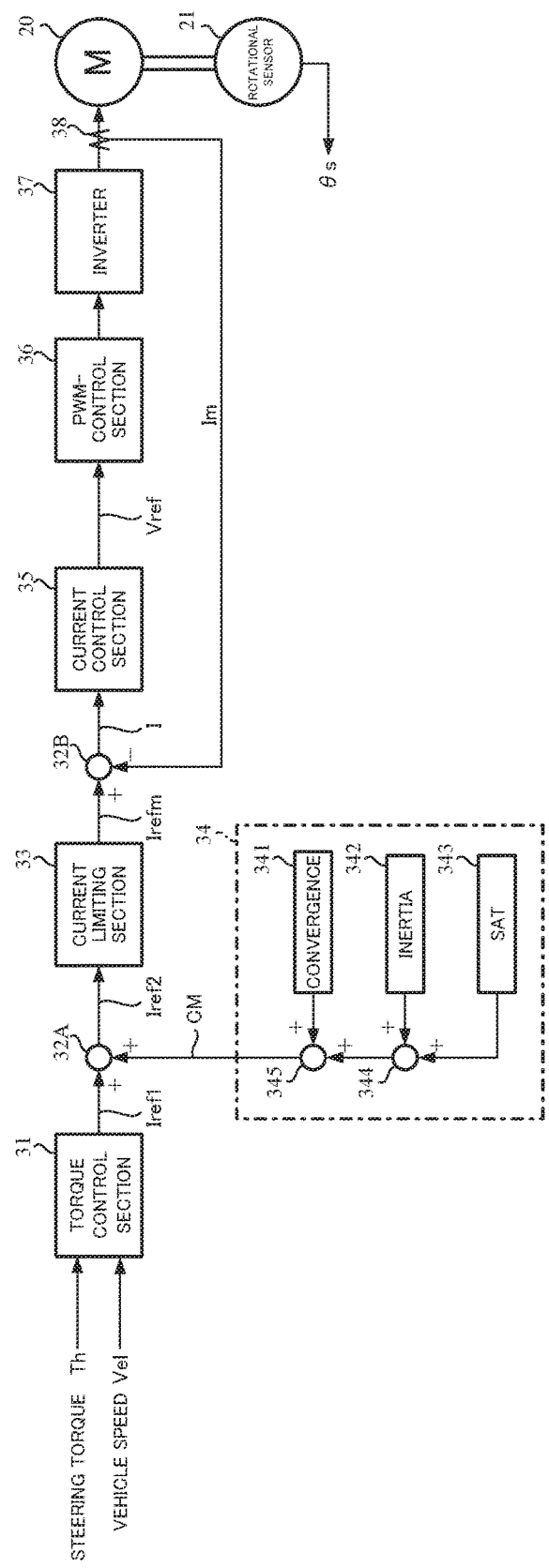
FIG. 2 is a block diagram showing a general configuration example of a control system of the electric power steering apparatus.
Figure 3:
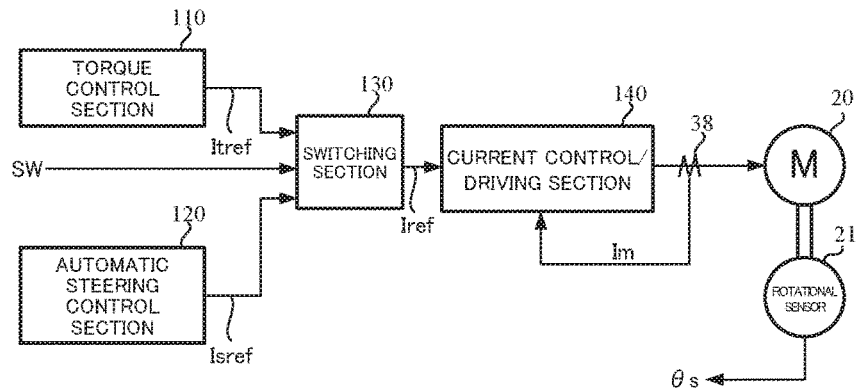
FIG. 3 is a block diagram illustrating a general configuration example of a control system of a vehicle that has an automatic steering control function.
Figure 4:
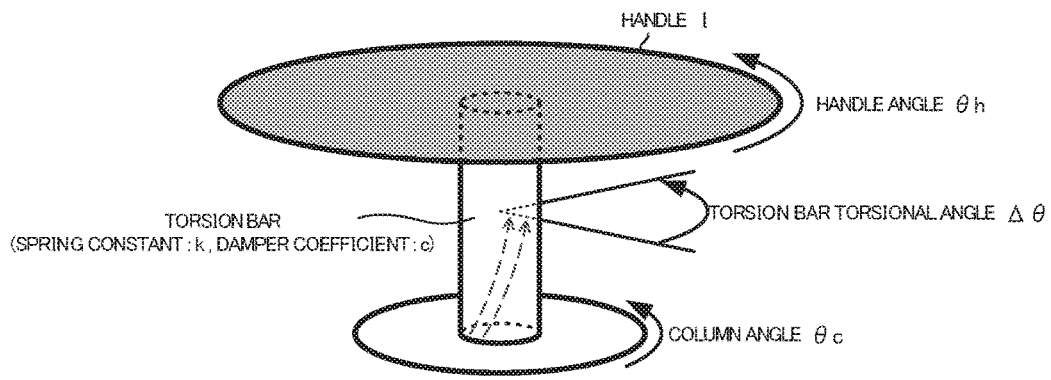
FIG. 4 is a diagram illustrating a mechanical relationship of a handle and a torsion bar in order to explain a principle of the present invention.

Here, a relationship of a handle angle $\theta_h$, a torsion bar torsional angle $\Delta\theta$ and a column angle $\theta_c$ s shown in FIG. 4. When a spring constant of the torsion bar and a damper constant of the torsion bar are respectively set as "k" and "c", a general mechanical equation without the manual input is represented by a following Equation 1.

$$J_h \ddot{\theta}_h = -(c\Delta\dot{\theta} + k\Delta\theta)$$ [Equation 1]

From FIG. 4, since the torsion bar torsional angle $\Delta\theta$ is a difference between the handle angle $\theta_h$ and the column angle $\theta_c$, a following Equation 2 is established.

$$\Delta\theta = \theta_h - \theta_c$$ [Equation 2]

The handle angle $\theta_h$ is eliminated from the Equations 1 and 2, further a steering torque=$k\Delta\theta$=y and the column angle $\theta_c$=u are assumed, and the Equations are organized by using the z-transformation. Although various kinds of the z-transformation exist, for example, a backward difference is applied to the Equations 1 and 2 and then a following Equation 3 is established. Actually, in an internal calculation of the ECU, the steering torque "y" to the detected column angle "u", in other words the steering torque to the column angle $\theta_c$ is calculated.

$$y[k] = \frac{1}{(J_h + cT + kT^2)} \{(2J_h + cT)y[k-1] - J_h y[k-2] - j_h(u[k] - 2u[k-1] + u[k-2])\}$$ [Equation 3]

In the present invention, the above Equation 3 is calculated in a calculating period Cs inside of the ECU, an adaptation degree of the calculated result "y" (the steering torque due to the calculation) of the Equation 3 and the actual detected steering torque is checked at each the calculating period Cs, and "presence" or "absence" of the manual input is judged. Indication of the adaptation degree may be an accumulating value (integral value or summation) of an absolute value of an error between, for example, the steering torque (the detected value) and the steering torque (the calculated value). When the checked result of the adaptation degree is a set threshold or more, it is judged that the manual input is "presence", and when the checked result of the adaptation degree is less than the threshold, it is judged that the manual input is "absence".

In a case that it is judged that the manual input is "presence", the automatic steering control is stopped, and the steering operation is shifted (switched) to the normal assist control (the manual steering control).

Embodiments according to the present invention will be described with reference to the drawings.

Figure 5:
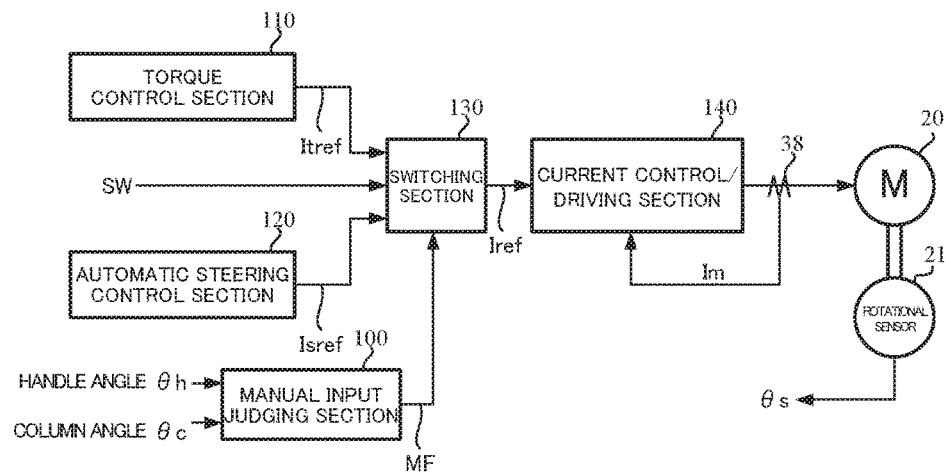
FIG. 5 is a block diagram illustrating a configuration example of the present invention.

FIG. 5 shows a configuration example, and there is provided a manual input judging section 100 to input the handle angle $\theta_h$ and the column angle $\theta_c$ and to judge "presence" or "absence" of the manual input from the calculated values by using the Equations 1 to 3. When the manual input judging section 100 judges that the manual input is "presence", the judging flag MF is outputted, the automatic steering control is stopped. Then, a current command value Iref from a switching section 130 is set as the current command value Itref from the torque control section 110 and the steering operation is shifted to the normal assist control.

Figure 6:
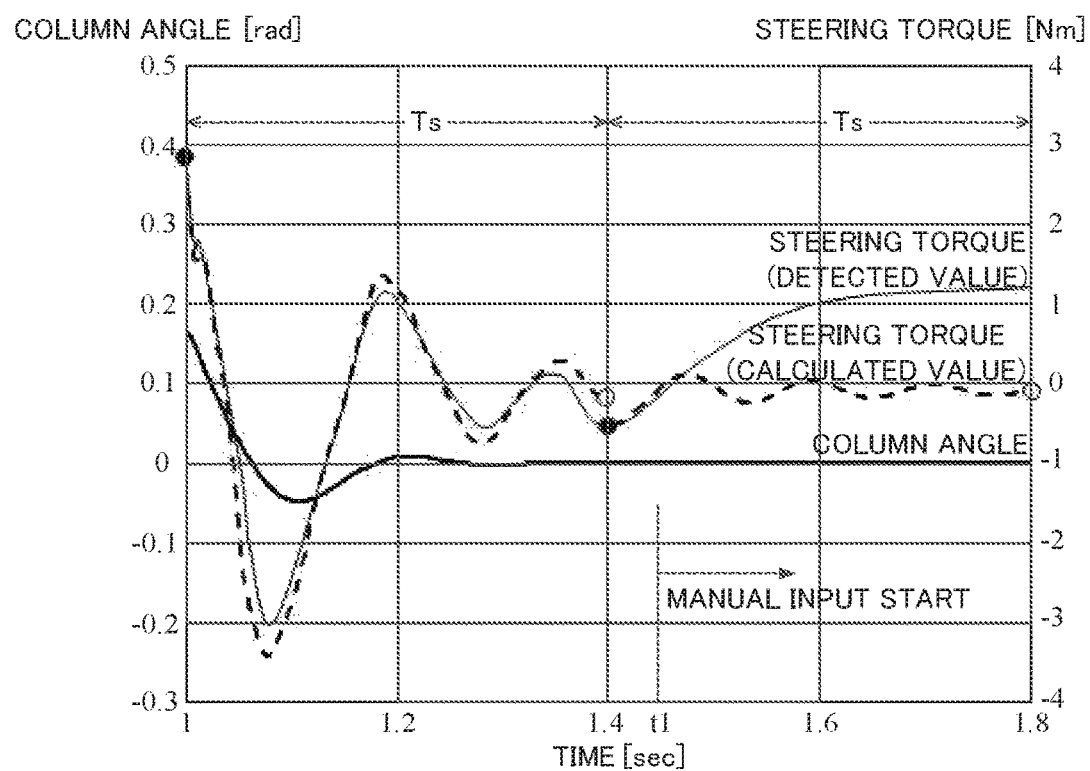
FIG. 6 is a timing chart illustrating an operating example of the present invention.

FIG. 6 shows a timing which calculates and performs a comparison-judgment at each setting period Ts. When the manual input is started at a time point t1, the difference between the steering torque (detected value) and the steering torque (calculated value) becomes great after the time point t1.

Figure 7:
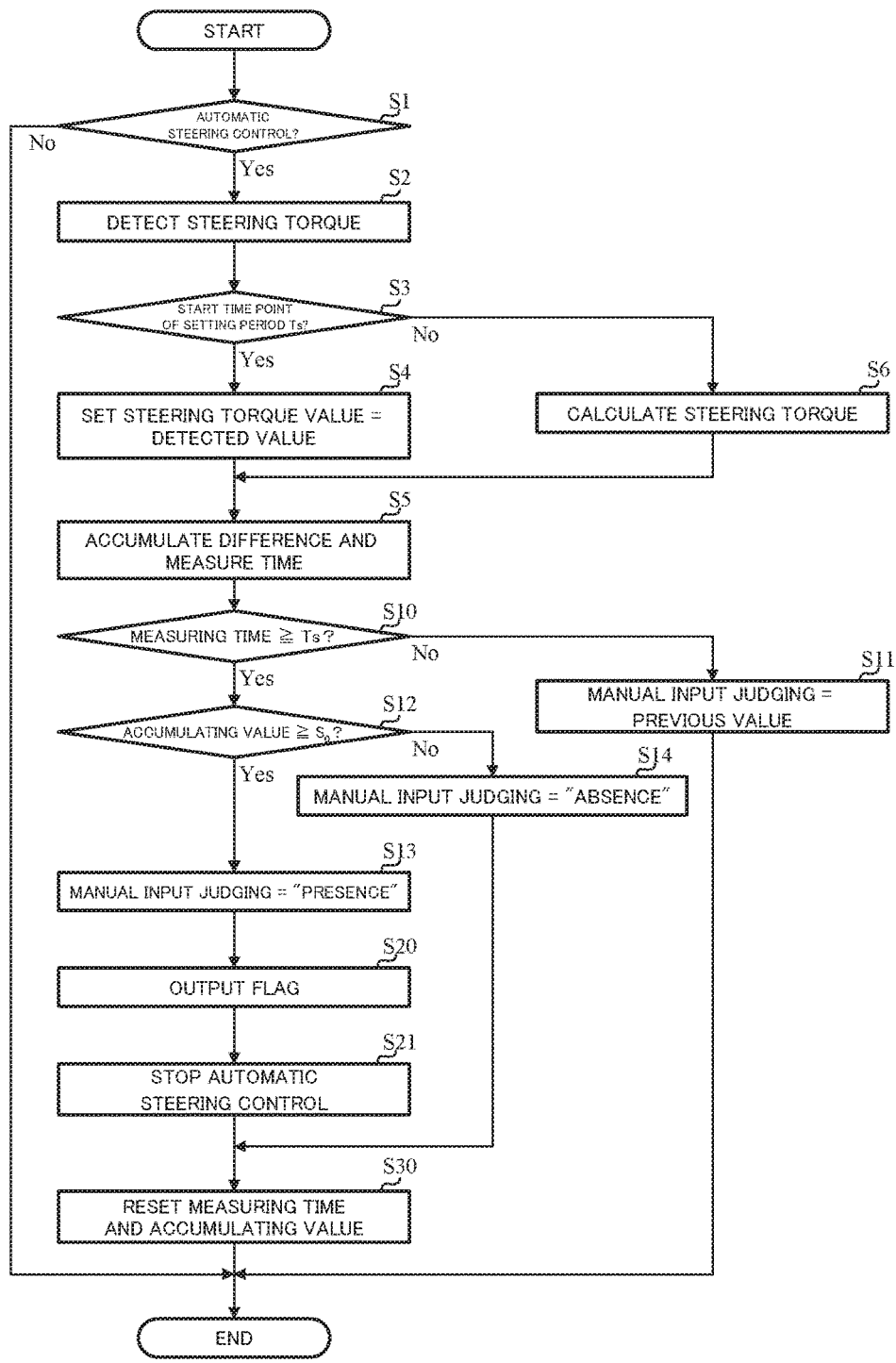
FIG. 7 is a flowchart illustrating an operating example of the present invention.

A flowchart of FIG. 7 shows an operating example of the present invention. At first, it is confirmed whether the steering operation is in the automatic steering control or not (Step S1), and a process is ended in a case of not the automatic steering control. In a case of the automatic steering control, the steering torque is first detected (Step S2), it is judged whether a time is the starting point of the setting period Ts, or not (Step S3). When the time is before the start time point, the steering torque is calculated (Step S6), and when the time is the start time point, a previous steering torque calculated-value is set as the detected value (Step S4).

Hereinafter, that is, after the above Step S4 or Step S6, the difference (the absolute value) between the steering torque and the detected steering torque is accumulated, and the passing time is measured (Step S5) . Then, it is judged whether the measuring time is the setting period Ts or more, or not (Step S10). When the measuring time is the setting period Ts or more, it is further judged whether the accumulating value is a predetermined threshold value $S_0$ or more, or not (Step S12). When the accumulating value is the predetermined value $S_0$ or more, it is judged that the judgment of the manual input is "presence" (Step S13). When the accumulating value is less than the predetermined value $S_0$, it is judged that the judgment of the manual input is "absence" (Step S14).

When it is judged that the judgment of the manual input is "presence", a flag MF which the judged result of the manual input indicates "presence" is outputted (Step S20), the automatic steering control is stopped by the switching section 130, and the steering operation is shifted to the normal assist control (Step S21). A subsequent process or when it is judged that the judgment of the manual input is "absence" in the above Step S12, the passing time and the accumulating value are reset (Step S30), and the process is ended.

In the above Step S10, when the passing time is less than the setting period Ts, the previous value is used in the judgment of the manual input (Step S11).

In the above-described embodiment, although the accumulating value of the absolute value of the difference between the calculated value of the torsion bar torque (the steering torque) and the detected value of the torsion bar torque (the steering torque) is compared with the threshold, the integrated value may also be used. Square or an accumulating value which values are multiplied by a gain in response to a time may also be used instead of the absolute value.

The column angle may be obtained from an angle sensor which directly detects the column angle. An angle which is obtained from a relationship of the motor angle and a reduction ratio may be used to the column angle. The torsion bar torsional angle may be obtained from a torsion bar torque sensor which directly detects the torsional angle. An angle which is obtained from a deviation between the handle angle and the column angle may be used to the torsion bar torsional angle.

Further, it is not limited to use the mechanical equation of the column angle and the torsional angle in a state that the manual input is "absence", and a time series response (calculated value or estimated value) based on an equation of the column angle and the handle angle, or the torsion bar torsional angle and the handle angle, may also be used.

EXPLANATION OF REFERENCE NUMERALS 1 handle (steering wheel)
2 column shaft (steering shaft, handle shaft)
10 torque sensor
12 vehicle speed sensor
13 battery
20 motor
21 motor driving section
100 manual input judging section
110 torque control section
120 automatic steering control section
130 switching section
140 current control/driving section

The invention claimed is:

1. An electric power steering apparatus that assist-controls a steering system by driving a motor based on a motor current command value and has a function performing an automatic steering control and a manual steering control, comprising:
 a function that obtains a steering torque calculated-value by calculating a handle angle, which is a time series response of a torsion bar torque estimated from a mechanical equation due to a handle inertia, a torsion bar characteristic and a motor angle in a state without a handle input, at each predetermined calculating period; judges an adaptation degree of said steering torque calculated-value and a steering torque detected-value corresponding to a column angle of said torsion bar torque at each setting period; performs said adaptation degree by a relationship of passing of a measuring time within a calculating period, a setting period and a starting time point of said setting period, and by a relationship of an accumulating value of a difference between said steering torque calculated-value and said steering torque detected-value, and a threshold; and judges "presence" or "absence" of a manual input during said automatic steering control by means of said adaptation degree.

2. The electric power steering apparatus according to claim 1, wherein it is judged that a manual input is "presence" when said passing of said measuring time is said setting period or more and said accumulating value is said threshold or more.

3. The electric power steering apparatus according to claim 2, wherein said automatic steering control is stopped when it is judged that said manual input is "presence".

* * * * *